(12) United States Patent
McMurtry et al.

(10) Patent No.: US 9,664,511 B2
(45) Date of Patent: May 30, 2017

(54) METHOD OF ANALOGUE MEASUREMENT SCANNING ON A MACHINE TOOL

(71) Applicant: RENISHAW PLC, Wotton-under-Edge, Gloucestershire (GB)

(72) Inventors: David Roberts McMurtry, Stancombe (GB); John Ould, Backwell Farleigh (GB); Tim Prestidge, Colerne (GB); Iain Ainsworth, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 125 days.

(21) Appl. No.: 14/391,837

(22) PCT Filed: Apr. 16, 2013

(86) PCT No.: PCT/GB2013/050964
§ 371 (c)(1),
(2) Date: Oct. 10, 2014

(87) PCT Pub. No.: WO2013/156765
PCT Pub. Date: Oct. 24, 2013

(65) Prior Publication Data
US 2015/0121710 A1    May 7, 2015

Related U.S. Application Data

(60) Provisional application No. 61/720,323, filed on Oct. 30, 2012.

(30) Foreign Application Priority Data

Apr. 18, 2012 (EP) ..................................... 12250093

(51) Int. Cl.
*G01B 21/04* (2006.01)
*G01B 5/008* (2006.01)
(Continued)

(52) U.S. Cl.
CPC ............. *G01B 21/04* (2013.01); *G01B 5/008* (2013.01); *G01B 7/008* (2013.01); *G01B 21/045* (2013.01); *G05B 19/401* (2013.01)

(58) Field of Classification Search
CPC ........ G01B 21/04; G01B 7/012; G01B 7/008; G01B 5/008
(Continued)

(56) References Cited

U.S. PATENT DOCUMENTS 4,084,323 A    4/1978  McMurtry
4,153,998 A    5/1979  McMurtry
(Continued)

FOREIGN PATENT DOCUMENTS

CN    85105480 A    1/1987
CN    1392950 A     1/2003
(Continued)

OTHER PUBLICATIONS

Jul. 2, 2015 Office Action issued in Taiwanese Patent Application No. 102113860.
(Continued)

*Primary Examiner* — Christopher Fulton
(74) *Attorney, Agent, or Firm* — Oliff PLC (57) ABSTRACT

A method of building up a measurement data set for a surface of an object using an analog measurement probe mounted on a machine tool apparatus which obtains scanned measurement data of the surface over a plurality of offset traverses. Subsequent traverses are offset from previous traverses such that over a series of traverses the analog probe's surface detecting region progresses i) laterally across the object, and/or ii) away from or towards the object. The course of relative motion for at least one subsequent traverse is generated and/or updated based on data obtained during at least one previous traverse.

15 Claims, 6 Drawing Sheets

(51) Int. Cl.
*G01B 7/008* (2006.01)
*G05B 19/401* (2006.01)

(58) Field of Classification Search
USPC .......................................................... 33/503
See application file for complete search history.

(56) References Cited

U.S. PATENT DOCUMENTS

| | | | |
|---|---|---|---|
| 4,166,323 A | 9/1979 | Maag | |
| 4,799,170 A | 1/1989 | Nakaya et al. | |
| 4,991,304 A | 2/1991 | McMurtry | |
| 5,115,401 A | 5/1992 | Oyama et al. | |
| 5,189,806 A * | 3/1993 | McMurtry | G01B 21/04 33/503 |
| 5,428,548 A | 6/1995 | Pilborough et al. | |
| 5,471,406 A | 11/1995 | Breyer et al. | |
| 6,580,964 B2 | 6/2003 | Sutherland et al. | |
| 7,100,430 B2 | 9/2006 | Samsavar et al. | |
| 7,146,291 B2 | 12/2006 | Hough | |
| 7,165,335 B2 | 1/2007 | McMurtry | |
| 7,254,506 B2 | 8/2007 | McMurtry et al. | |
| 7,293,365 B2 | 11/2007 | McMurtry et al. | |
| 7,318,284 B2 | 1/2008 | McMurtry et al. | |
| 7,523,561 B2 * | 4/2009 | McFarland | G01B 21/04 33/554 |
| 7,543,393 B2 * | 6/2009 | McMurtry | G01B 21/042 33/502 |
| 7,752,000 B2 | 7/2010 | Schulze et al. | |
| 7,866,056 B2 * | 1/2011 | Ould | G01B 21/042 33/503 |
| 7,886,453 B2 | 2/2011 | Ould et al. | |
| 7,900,367 B2 | 3/2011 | Sutherland | |
| 8,006,398 B2 | 8/2011 | McFarland et al. | |
| 8,006,402 B2 | 8/2011 | Yoshizumi et al. | |
| 8,756,973 B2 | 6/2014 | Wallace et al. | |
| 8,991,246 B2 | 3/2015 | Hirono et al. | |
| 9,366,519 B2 * | 6/2016 | Danbury | G01B 5/008 |
| 9,400,178 B2 | 7/2016 | Marshall et al. | |
| 2001/0047682 A1 | 12/2001 | Samsavar et al. | |
| 2003/0019119 A1 | 1/2003 | Sato et al. | |
| 2004/0244464 A1 * | 12/2004 | Hajdukiewicz | G01B 21/042 73/1.79 |
| 2005/0005688 A1 | 1/2005 | Samsavar et al. | |
| 2005/0194534 A1 | 9/2005 | Kneedler et al. | |
| 2005/0263727 A1 | 12/2005 | Noda | |
| 2007/0050089 A1 | 3/2007 | Sun et al. | |
| 2008/0051927 A1 | 2/2008 | Prestidge et al. | |
| 2008/0249737 A1 | 10/2008 | Jordil et al. | |
| 2009/0307916 A1 | 12/2009 | McLean et al. | |
| 2010/0050837 A1 | 3/2010 | Ould et al. | |
| 2010/0119104 A1 | 5/2010 | Mamour et al. | |
| 2011/0184695 A1 | 7/2011 | Grzesiak | |
| 2011/0264402 A1 | 10/2011 | Anderson et al. | |
| 2011/0276303 A1 | 11/2011 | Marshall et al. | |
| 2011/0283553 A1 | 11/2011 | McFarland et al. | |
| 2012/0150354 A1 | 6/2012 | Rogers et al. | |
| 2015/0101204 A1 * | 4/2015 | Ould | G01B 7/012 33/503 |

FOREIGN PATENT DOCUMENTS

| | | |
|---|---|---|
| CN | 1474159 A | 2/2004 |
| CN | 1695036 A | 11/2005 |
| CN | 1727871 A | 2/2006 |
| CN | 101166951 A | 4/2008 |
| CN | 100437027 C | 11/2008 |
| CN | 100476348 C | 4/2009 |
| CN | 101622513 A | 1/2010 |
| CN | 101669009 A | 3/2010 |
| CN | 102197274 A | 9/2011 |
| DE | 19730471 A1 | 2/1999 |
| EP | 0 588 512 A1 | 3/1994 |
| EP | 1 260 789 A2 | 11/2002 |
| EP | 2102589 B1 | 3/2010 |
| GB | 2302589 A | 1/1997 |
| JP | H02-145908 A | 6/1990 |
| JP | H10-31084 A | 2/1998 |
| JP | 2005-345123 A | 12/2005 |
| JP | 2005-345165 A | 12/2005 |
| JP | 2005-537474 A | 12/2005 |
| JP | 2009-293992 A | 12/2009 |
| JP | 2010-513042 A | 4/2010 |
| JP | 2010-537184 A | 12/2010 |
| JP | 2012-011544 A | 1/2012 |
| TW | 200537070 | 11/2005 |
| TW | 200951464 A1 | 12/2009 |
| TW | 201111100 A1 | 4/2011 |
| WO | 90/07097 A1 | 6/1990 |
| WO | 92/20996 A1 | 11/1992 |
| WO | 03/012561 A2 | 2/2003 |
| WO | 2005/028996 A1 | 3/2005 |
| WO | 2005/031254 A1 | 4/2005 |
| WO | 2005/065884 A2 | 7/2005 |
| WO | 2006/003380 A1 | 1/2006 |
| WO | 2006/013387 A2 | 2/2006 |
| WO | 2006/115923 A2 | 11/2006 |
| WO | 2006/115923 A3 | 11/2006 |
| WO | 2008/074989 A1 | 6/2008 |
| WO | 2009/010721 A1 | 1/2009 |
| WO | 2012/037059 A1 | 3/2012 |

OTHER PUBLICATIONS

Apr. 7, 2015 Office Action issued in Taiwanese Application No. 102113861.
Apr. 20, 2015 Office Action issued in Taiwanese Application No. 102113862.
Aug. 8, 2014 Office Action and Search Report issued in Taiwanese Application No. 102113862.
"Scanning Systems for Reverse Engineering". Renishaw PLC. 1999.
"Installation Guide RENSCAN 200—Scanning System for Machine Tools". Renishaw PLC. 1997.
"Installation Guide RETROSCAN—Scanning System for Machine Tools". Renishaw PLC. 1996.
U.S. Appl. No. 14/391,950 in the name of Wooldridge et al., filed Oct. 10, 2014.
U.S. Appl. No. 14/391,822 in the name of Ould et al., filed Oct. 10, 2014.
Lee, K. H. et al. "A Framework for Laser Scan Planning of Freeform Surfaces." International Journal of Advanced Manufacturing Technology. vol. 17, pp. 171-180, 2001.
Elkott, Diaa et al. "Isoparametric line sampling for the inspection planning of sculptured surfaces." Computer-Aided Design. vol. 37, pp. 189-200, 2005.
Fernandez, Pedro et al. "Laser scan planning based on visibility analysis and space partitioning techniques." International Journal of Advanced Manufacturing Technology. vol. 39, pp. 699-715, 2008.
Jul. 17, 2012 Search Report issued in European Application No. 12 25 0093.
Jul. 25, 2013 International Search Report and Written Opinion issued in PCT Application No. PCT/GB2013/050964.
Sep. 1, 2014 Office Action issued in Taiwanese Application No. 102113860.
Jul. 18, 2012 Search Report issued in European Application No. 12 25 0095.
Jul. 25, 2013 International Search Report and Written Opinion issued in PCT Application No. PCT/GB2013/050966.
Sep. 1, 2014 Office Action issued in Taiwanese Application No. 102113861.
Jul. 25, 2013 International Search Report and Written Opinion issued in PCT Application No. PCT/GB2013/050968.
Jul. 19, 2012 Search Report issued in European Application No. 12 25 0096.
"TRACECUT Powerful Software for the Mould and Die Industry," Renishaw Data Sheet H-2000-2293-04-A.
"RENSCAN Retrofit 'Closed Loop' Scanning System for Machine Tools," Renishaw Data Sheet Part No. H-2000-2068-03-A.

(56) References Cited

OTHER PUBLICATIONS

"RENSCAN 200 A Fast Retrofit Scanning System for Machine Tools," Renishaw Data Sheet Part No. H-2000-2068-PA.
Jun. 23, 2016 Office Action Issued in U.S. Appl. No. 14/391,822.
Jul. 28, 2016 Office Action issued in Chinese Application No. 201380024772.2.
Dec. 22, 2016 Office Action issued in Chinese Application No. 201380031456.8.
Dec. 13, 2016 Office Action issued in U.S. Appl. No. 14/391,822.
Jan. 26, 2017 Office Action issued in Chinese Application No. 201380027017.X.
Dec. 27, 2016 Office Action issued in Japanese Application No. 2015-506299.
Feb. 14, 2017 Office Action issued in Japanese Patent Application No. 2015-506298.
Mar. 28, 2017 Office Action issued in European Patent Application No. 13 719 596.2.
Feb. 14, 2017 Office Action issued in Japanese Patent Application No. 2015-506301.

\* cited by examiner

METHOD OF ANALOGUE MEASUREMENT SCANNING ON A MACHINE TOOL

This invention relates to a method of measuring an artefact, and in particular to a method of scanning an artefact using an analogue measurement tool mounted on a machine tool.

It is known to mount a measurement probe in a machine tool spindle, for movement with respect to a workpiece, in order to measure the workpiece. In practice, the probe has typically been a touch trigger probe, e.g. as described in U.S. Pat. No. 4,153,998 (McMurtry), which produces a trigger signal when a stylus of the probe contacts the workpiece surface. This trigger signal is taken to a so-called "skip" input of the machine tool's numeric controller (NC). In response, relative movement of the object and workpiece are stopped and the controller takes an instantaneous reading of the machine's position (i.e. the position of the spindle and the probe relative to the machine). This is taken from measurement devices of the machine such as encoders which provide position feedback information in a servo control loop for the machine's movement. A disadvantage of using such a system is that the measurement process is relatively slow resulting in long measurement times if a large number of measurement points are required.

Analogue measurement probes (also commonly known as scanning probes) are also known. Contact analogue probes typically comprise a stylus for contacting the workpiece surface, and transducers within the probe which measure the deflection of the stylus relative to the probe body. An example is shown in U.S. Pat. No. 4,084,323 (McMurtry). In use, the analogue probe is moved relative to the surface of the workpiece, so that the stylus scans the surface and continuous readings are taken of the outputs of the probe transducers. Combining the probe deflection output and the machine position output allows co-ordinate data to be obtained thereby allowing the position of the workpiece surface to be found at a very large number of points throughout the scan. Analogue probes thus allow more detailed measurements of the form of the workpiece surface to be acquired than is practically possible using a touch trigger probe.

As will be understood (and explained in more detail below in connection with FIG. 2), an analogue probe has a limited measurement range. Furthermore, the analogue probe might have a preferred measuring range. The analogue probe might be able to obtain data outside its preferred measuring range, but the data obtained outside this range could be less preferred, for instance because it could be considered to be less accurate than the data obtained within the preferred measuring range. The boundaries of the preferred measuring range can vary depending on many different factors, including the type of probe, the calibration routine used, and even for instance the object being measured. In many circumstances it can be preferred to ensure that the analogue probe is kept within its preferred measuring range as it scans along the surface of the workpiece. The preferred measurement range of an contact analogue probe can be for example +1-0.8 mm in any given dimension or smaller, for example in some circumstances as small as +/−0.3 mm in any given dimension. (These values could be measured from the stylus' rest position). Furthermore, the actual preferred measurement range could be even smaller than the figures given above because it might be that a minimum amount of deflection could be needed to enter the preferred measuring range. Accordingly, although the preferred measuring range might be +/−0.5 mm from the rest position, at least the first +/−0.05 mm of deflection or for example the first +/−0.1 mm of deflection might not be within the preferred measuring range (again, this is explained in more detail below in connection with FIG. 2). Accordingly, as will be understood, real-time management of the probe/workpiece positional relationship is required to avoid situations in which the analogue probe falls outside its preferred measuring range.

This is why analogue probes have typically only been used with dedicated co-ordinate measuring machines (CMMs) even though analogue probes have been known per se for many years; CMMs have dedicated real-time control loops to enable such management of probe deflection to occur. In particular, in CMMs a controller is provided into which a program is loaded which defines a predetermined course of motion for the measurement probe to move along relative to a workpiece. The controller generates motor control signals from the program which are used to activate motors to induce movement of the measurement probe. The controller also receives real-time position data from the machine's encoders and also deflection data (in the case of a contact probe) from the analogue probe. In order to accommodate for variations in the material condition of the workpiece a dedicated control loop arrangement exists. This comprises a feedback module into which the above mentioned motor control signals and deflection data are fed. The feedback modules uses logic to continuously update (based on the deflection data) an offset control vector which in turn is used to adjust the above mentioned motor control signal generated from the program before it is sent to the CMM's motors so as to try to maintain probe deflection within the preferred measuring range as the analogue probe scans the workpiece. This all happens within a closed loop control loop with a response time of less than 1 to 2 ms. This is for example described in WO2006/115923. Furthermore, such a real-time control loop using real-time data from the analogue probe itself is embodied in the Cyclone™ digitising machine previously obtainable from Renishaw® plc. In that machine, the analogue probe was controlled to follow a predetermined path, specifically a 2D raster path across a bounding area containing an unknown object. When it detected an unknown or unexpected feature in its path, the speed of motion was significantly reduced such that real-time control could be used to guide the analogue probe over the unknown or unexpected feature without losing the surface of the feature or over deflecting the probe. Furthermore, the presence of the unknown or unexpected feature was subsequently predicted if/when the probe scanned in the vicinity of the unknown or unexpected feature again on a subsequent raster scan such that the speed of motion was reduced to enable real-time control to guide the probe over the unexpected feature.

Such tight control over probe positioning plus the ability to process real-time stylus deflection data allows such dedicated CMMs to scan complex articles that deviate from their expected shape and even to scan articles of unknown shape.

To date, analogue probes have not been widely used for machine tool scanning applications. This is due to the inherent nature of many commercially available machine tools which do not facilitate the real-time control of the analogue probe that CMMs provide. This is because machine tools are primarily developed to machine workpieces and the use of measurement probes on them to measure workpieces is essentially an after-thought. Machine tools are therefore typically not configured for real-time control using data from an analogue measurement probe. Indeed, it is often the case that a machine tool's controller has no in-built provision for the direct receipt of deflection data from the measurement probe. Rather, the probe has to communicate (e.g. wirelessly) with an interface which receives the probe deflection data and passes the data to a separate system which subsequently combines the deflection data with machine position data so as to subsequently form complete object measurement data, for instance as described in WO2005/065884.

This makes it difficult to use an analogue probe on a machine tool to obtain scanned measurement data about known objects, because any variation from the expected shape of the object can cause the probe to over deflect and hence cause the measurement process to fail (whereas on a CMM the probe's course of motion could be updated quickly enough to ensure that the probe doesn't over deflect) . This also makes it difficult to use an analogue probe on a machine tool to obtain scanned measurement data about unknown objects because this inherently requires the probe's course of motion to be updated quickly enough so as to avoid over deflection.

Techniques for overcoming the problems of using an analogue scanning probe on a machine tool have been developed. For instance, drip feed techniques are known in which the program instructions are loaded into the machine tool's controller in a drip fed manner. In particular, each instruction causes the probe to move by a tiny distance (i.e. less than the probe's preferred deflection range), and the probe's output is analysed to determine the extent of deflection, which in turn is used to generate the next instruction to be fed into the controller. However, such a technique is still much more limited than the scanning techniques that can be performed using an analogue scanning probe on a CMM. In particular, such a methods is very slow and inefficient.

WO2008/074989 describes a process for measuring a known object which involves repeating a measurement operation according to an adjusted path if a first measurement operation resulted in over or under deflection.

The problem can also be further compounded when using analogue probes on machine tools because due to their construction (which enables them to be able to used within the harsher environments that machine tools provide and the greater accelerations and forces they are exposed to such as when they are auto-changed into/out of a machine tool's spindle) they often have a much smaller measurement range than those analogue probes which are for use with CMMs, for example +/−0.8 mm in any given dimension or smaller (measured from the stylus' rest position), for example in some circumstances +/−0.5 mm in any given dimension or smaller, and for example in some circumstances no bigger than +/−0.3 mm in any given dimension. This can therefore give even less room for error compared to analogue probes used on CMMs. As mentioned above, a minimum deflection might also be required in order to enter the preferred measuring range.

As a specific example, the measurement range could be defined by a maximum deflection 0.725 mm and a minimum deflection of 0.125 mm (measured from the stylus' rest position). Accordingly, in this case, this can mean that the surface can be +/−0.3 mm from nominal whilst maintaining an accurate measurement. However, this figure can be smaller, and for instance it is known to for surface uncertainties to be as small as +/−0.1 mm, which corresponds to a maximum probe deflection of around +/−0.325 mm and a minimum probe deflection of +/−0.125 mm.

According to a first aspect of the invention there is provided a method of building up a measurement data set for a surface of an object using an analogue measurement probe mounted on a machine tool apparatus which obtains scanned measurement data of the surface over a plurality of offset traverses, in which subsequent traverses are offset from previous traverses such that over a series of traverses the analogue probe's surface detecting region progresses i) laterally across the object, and/or ii) or away from or towards the object, and in which the course of relative motion of the object and analogue probe for at least one subsequent traverse is generated and/or updated based on data obtained during at least one previous traverse.

Accordingly, measurement data obtained from a previous traverse can be used to determine the course of motion along a subsequent traverse. This can improve the efficiency of obtaining scanned measurement data. In particular, it can be used to ensure that the analogue probe and object avoid undesirable circumstances during subsequent traverses, such as for example a contact analogue probe over deflecting (e.g. extending at or beyond an extent at which measurement data cannot be (e.g. reliably) obtained, and/or at which the analogue probe is at risk of breaking). In embodiments in which it is preferred that data is obtained within a first, e.g. preferred, measurement range, it can be used to help avoid the analogue probe exceeding its preferred measuring range (e.g. obtaining data that is beyond its preferred measuring range). In certain circumstances, it could be used to help maintain the analogue probe's measurements within its first, e.g. preferred, measurement range.

As will be understood, the surface detecting region of an analogue probe can be the region in space in which the analogue probe can detect the surface of the object, and hence collect measurement data about the object. As will be understood, this will vary from probe to probe. In the case of a contact probe, this can comprise the surface contacting part of the probe (e.g. the stylus tip of an analogue probe having a stylus). In the case of a non-contact probe, it can be the point, area or volume in space in which the non-contact probe can sense and measure the surface.

As will be understood, a traverse can comprise the surface detecting region traversing relatively across the object. This could be achieved by moving the analogue probe and/or object relative to each other. For instance, this could be achieved by translationally and/or rotationally moving the analogue probe and/or object relative to each other. Accordingly, a traverse could comprise controlling the analogue probe and/or object according to a course of relative motion such that the surface detecting region traverses the object.

As will be understood, a controller can be provided which can control the machine tool so as to relatively move the analogue probe and object in accordance with a program defining a relative course of motion. The method can comprise loading into the machine tool's controller a predetermined course of motion defining a plurality of offset traverses. In this case, the course of relative motion for at least one subsequent traverse can be generated and/or updated by altering the predetermined course of motion for said subsequent traverse based on data obtained during at least one previous traverse. As will be understood, in another embodiment, it might be that the course of motion for each traverse is generated "on the fly", i.e. as and when required. Accordingly, the method could comprise loading in a course of motion for a first traverse, and in which the course of motion for a subsequent traverse is generated (and/or loaded into the controller) during, or after execution of the first traverse, and for instance based on data obtained during the first traverse.

Updating the course of motion for the at least one subsequent traverse can comprise changing a program loaded into the controller defining the course of motion. Updating the course of motion can comprise generating a new program defining a new course of motion. Updating the course of motion can comprise loading the new program into the machine tool's controller. The new program could be generated in a processor device (e.g. a PC) separate to the machine tool's controller. Changing the program can comprise amending a predetermined program already loaded into the controller. This can be much quicker and more efficient than generating a new program that is to be loaded into the controller.

Updating the course of motion can optionally comprise (in addition to or alternatively to changing the program) changing data referred to by the program. This can comprise changing at least one variable referred to by the program loaded into the controller. The variable could be part of the program or part of a variable table separate to but associated with the program, and for instance stored in the controller. This is a particularly quick and efficient way of altering the course of motion. The variable can relate to a nominal offset distance between a part of the probe and the expected surface of the feature. For instance, it can relate to the nominal offset of the probe tip centre from the expected surface of the object.

The at least one subsequent traverse could be updated so as to avoid adverse positional relationships between the object and analogue probe. As will be understood, what is considered to be an adverse positional relationship will depend on the particular circumstances, but can of course be known and/or defined prior to the operation. For instance, an adverse positional relationship might be one that causes over deflection of the stylus of a contact probe (e.g. deflection beyond a predefined extent). As another example, an adverse positional relationship could be one that causes the object and non-contact probe to touch each other, or be brought closer together by an amount than a preferred minimum separation distance.

Accordingly, the method can comprise updating the at least one subsequent traverse so as to avoid positional relationships between the object and analogue probe which would cause the analogue probe to obtain data exceeding a first threshold. Such a technique can used to determine when the analogue probe and object would enter into an adverse positional relationship, and the subsequent scan could be generated/updated to avoid such a situation.

The analogue probe can have a first, e.g. preferred, measurement range. The first, e.g. preferred measuring range can be less than the total measuring range of the analogue probe. In the case of a contact probe, the preferred measuring range can be less than the total deflection range of the analogue probe. Accordingly, the first, e.g. preferred, measurement range could be a subset of the analogue probe's entire measurement range. The exact boundaries of the first, e.g. preferred, measurement range can vary from probe to probe and even from measurement operation to measurement operation for any given probe. It could be the range for which the analogue probe has been calibrated for any given measurement operation, e.g. to give a desired level of accuracy. It could be that the surface measurement data is obtained both within and outside the analogue probe's first, e.g. preferred, measurement range along any given traverse.

The preferred measurement range can be defined by at least an upper boundary, and optionally a lower boundary too (e.g. for a contact probe, a maximum and optionally minimum preferred extent of deflection). The upper boundary of the preferred measuring range could be defined by a second threshold that is smaller than the first threshold mentioned above (in connection with avoiding adverse positional relationships). At least one subsequent traverse can be updated so as to avoid positional relationships which would cause the analogue probe to obtain measurements that would exceed its upper boundary.

Surface measurement data could be collected along a nominal measurement line on the surface of the object. The method could be configured such that for each traverse the analogue probe obtains measurement data along substantially the same nominal measurement line on the surface of the object. This could be preferred for embodiments in which the method is configured such that over a series of traverses the analogue probe's surface detecting region progresses away from or towards the object.

Optionally, the method could be configured such that for each traverse, the analogue probe obtains measurement data along a different nominal measurement line on the surface of the object. This could be the case for instance when the method is configured such that over a series of traverses the analogue probe's surface detecting region progresses laterally across the object. In this case, the form of the nominal measurement line of a plurality of the traverses can be substantially identical. Accordingly, the nominal measurement lines can be different in that their location is different. For instance, the nominal measurement lines of the traverses could be located spaced apart from each other. In this case, the nominal measurement lines of the traverses could be configured to extend substantially parallel to each other.

The data obtained during at least one previous scan on which the subsequent scan is updated/generated, could comprise measurement data from the analogue probe. It could also comprise data from other sources on the machine tool. For instance, it could comprise machine position data (e.g. data indicative of the relative position of the analogue probe and object). Such machine position data could be for instance from position reporting devices (e.g. position encoders) reporting the position of the probe within the machine tool's coordinate space. The data obtained during at least one previous scan on which the subsequent scan is updated/generated could comprise only data from the analogue probe. This can be simpler and much more efficient than taking into consideration data from other parts of the machine.

The analogue probe could be a non-contact analogue probe, for instance an optical, capacitance or inductance probe. In this case, any first, e.g. preferred, measurement range could be a distance or separation range between a part of the analogue probe (e.g. the workpiece sensing part) and the workpiece surface. Accordingly, any such first, e.g. preferred, measurement range could comprise upper and lower boundaries or thresholds relating to maximum and minimum probe-object separations. The analogue probe can be a contact analogue probe. For instance, the analogue probe could be a contact analogue probe with a deflectable stylus for contacting the object. In this case, any first, e.g. preferred, measurement range can be a first, e.g. preferred, stylus deflection range. Accordingly, any such first, e.g. preferred, measurement range could comprise an upper (and optionally lower) boundary or threshold relating to maximum (and optionally minimum) stylus deflection.

The object could be an object that was (and/or is to be) machined on the machine on which the analogue probe is mounted. Accordingly, the method could comprise, the same machine tool machining the object, for example prior to the above described measuring steps. Optionally machining could take place after the above described measuring steps. Such post-measurement machining could take place on the same machine tool on which the measurement occurred. Such post-measurement machining could be based on measurement data obtained during the above described measurement steps. The machine tool could be a cutting machine, such as a metal cutting machine.

As will be understood, it might be the case that a traverse results in no surface measurement data being obtained. For example, it might be that for a traverse the surface detection region and object do not coincide. Preferably, at least some surface measurement data is obtained during a traverse. Accordingly, it might be that for a traverse the surface detection region and object coincide for only part of the traverse. For instance, the surface detection region might come onto the surface and then fall off it again along the traverse. In embodiments in which the analogue probe has a first, e.g. preferred, measuring range, it might be that for any given traverse, the analogue probe obtains surface measurement data within its preferred measuring range along only part of the traverse.

Preferably, additional surface measurement data is obtained over successive subsequent traverses. Accordingly, a subsequent traverse could be offset so that during the subsequent traverse surface measurement data is obtained about a part of the object's surface that hasn't been collected during a previous traverse. In embodiments in which the analogue probe has a preferred measuring range, a subsequent traverse could be offset so that during the subsequent traverse surface measurement data is obtained about a part of the object's surface within the analogue probe's preferred measuring range that hasn't been collected within the analogue probe's preferred measuring range during a previous traverse.

The analogue probe could be a sealed analogue probe. That is the analogue probe could be sealed so as to protect internal sensor componentry from external contaminants. For instance, the probe could comprise a probe body which houses a sensor for either directly or indirectly measuring the surface of an object, in which the sensor is sealed from external contaminant. For instance, in the case of a deflectable contact probe, the probe could comprise a probe body, a stylus member and a sensor for measuring displacement of the stylus member relative to the housing, in which at least a first compliant sealing member is provided which extends between the probe body and relatively moveable stylus member, such that the sensor is contained within a sealed chamber and thereby sealed from external contaminants.

The object can be a blade. For instance, the blade could be a blade of a turbine engine.

As mentioned above, the method could comprise loading into the machine tool's controller a predetermined course of motion defining the plurality of offset traverses. In this case, the method could comprise updating said predetermined course of motion (and thereby said at least one subsequent traverse) at least one of a number of predetermined points during the scanning operation based on prior collected scanned measurement data. Following a predetermined course of motion can be an efficient way of measuring an object, and as it can be adapted at certain points, such that undesirable circumstances can be avoided, such as a contact analogue probe over deflecting.

The predetermined points could be at predetermined (for example, regular) points in time and/or at predetermined points along the predetermined course of motion, e.g. at predetermined locations along the length of the path. The predetermined points can be defined by the program loaded into the controller defining the predetermined course of motion. The predetermined points can be spaced apart by a distance greater than a first, e.g. preferred measuring range of the analogue probe and for instance by a distance greater than the total measuring range of the analogue probe. The predetermined points could be at the end of each traverse.

It could be determined at each of the predetermined points whether the predetermined course of motion should be updated. Optionally, the determination of whether the predetermined course of motion should be updated could occur during the scanning operation between the predetermined points. Optionally, the scanned measurement data could be continuously analysed, or periodically analysed at other instances; for example between said predetermined points during the relative movement along the predetermined course of motion. The above can also be true for determining how to update the predetermined course of motion. Accordingly, the method could comprise merely updating the predetermined course of motion at the predetermined points. Optionally, the method could comprise, at the predetermined points, determining whether the predetermined course of motion should be updated (e.g. based on prior collected scanned measurement data) and/or determining how to update the predetermined course of motion (e.g. based on prior collected scanned measurement data).

The predetermined course of motion can be configured such that for each traverse the probe obtains measurement data along substantially the same nominal measurement line on the surface of the object. In this case, the positional relationship between the analogue probe and object can be different for different traverses. This could be so that for different traverses the analogue probe obtains data for the same parts of the nominal measurement line, at different points within its measurement range.

The predetermined course of motion can be configured such that the positional relationship between the analogue probe and object is different for different traverses such that the position of the analogue probe's first, e.g. preferred, measuring relative to the object is different for different traverses. In particular, this could be so that the position (normal to the surface) of the analogue probe's first, e.g. preferred, measuring relative to the object is different for different traverses. Accordingly, this could be so that for different traverses different parts of object are within the first, e.g. preferred, measurement range.

The first, e.g. preferred, measurement range can be defined by upper (and optionally lower) boundaries. The predetermined course of motion can be updated so as to avoid positional relationships which would cause the analogue probe to obtain measurements that would exceed its upper boundary.

The position of the analogue probe's surface detecting region could be configured to fall over successive traverses. The position could be measured between a reference point with respect to the surface detecting region and the surface of the object, e.g. a point within the surface detecting region. Accordingly, for instance, preferably the line along which the centre of the surface detecting region follows for each traverse could, on average, progressively fall (e.g. get closer to/penetrate deeper into) with respect to the surface of the object over successive traverses. This could happen in a step-by-step manner, e.g. at the end of each traverse.

The course of relative motion can be configured such that the difference between previous and subsequent traverses is sufficiently small such that if along the previous traverse no surface measurement data was obtained, the subsequent traverse will not cause the analogue probe to obtain object surface measurement data that exceeds its entire measurement range, and for example will not cause the analogue probe to obtain data beyond its preferred measuring range. Optionally, traverses are offset from each other in steps that are no bigger than, and for instance are smaller than, the entire measurement range of the probe. For example, traverses can be offset from each other in steps that are no bigger than, and for instance are smaller than, the preferred measuring range of the probe.

Accordingly, this application also describes a method of measuring a feature of an object using an analogue probe mounted on a machine tool apparatus, the method comprising: loading into the machine tool's controller a predetermined course of motion along which the analogue probe and object can move relative to each other so as to collect scanned measurement data regarding the feature; performing a scanning operation by relatively moving the analogue probe and/or object according to the predetermined course of motion; in which the predetermined course of motion is updated at at least one of a number of predetermined points along the predetermined course of motion (i.e. not at the end) based on prior collected scanned measurement data. Such predetermined points can be points in time or space (e.g. location).

Accordingly, the present invention provides method by the relative movement of the analogue probe and workpiece are configured to follow a predetermined course of motion which can be an efficient way of measuring an object, but which can be adapted at certain points, for instance to avoid undesirable circumstances, such as a contact analogue probe over deflecting (described in more detail below).

The predetermined course of motion can comprise a plurality of traverses across the surface of the object so as to obtain scanned measurement data. At least one future traverse can be updated based on data collected during at least one previous traverse. Accordingly, the predetermined points could be at the end of each traverse.

According to another aspect of the invention there is provided a method of measuring a feature of an object using an analogue probe mounted on a machine tool apparatus, the method comprising: causing the analogue probe and object to move relative to each other such that the analogue probe obtains scanned measurement data along a scanning path that comprises a plurality of traverses across the surface of the object that follow different nominal measurement lines on the surface of the object; in which the course of relative motion of the analogue probe and object along at least one traverse is based on data obtained during at least one previous traverse.

Accordingly, measurement data from a previous scan along a nominal measurement line can be used to determine the course of motion along a subsequent different nominal measurement line on the surface of the object. This can improve the efficiency of obtaining scanned measurement data along the subsequent nominal measurement line. In particular, it can be used to ensure that the analogue probe and object avoid undesirable circumstances, such as a contact analogue probe over deflecting. In embodiments in which it is preferred that data is obtained within a first, e.g. preferred, measurement range, it can be used to help maintain the analogue probe's measurements being obtained within its first measurement range.

The form of the nominal measurement line of the traverses can be substantially identical. The nominal measurement lines can extend substantially parallel to each other. The course of motion for each traverse can be generated based on data obtained during at least one previous traverse.

The course of motion for each traverse could be generated as and when needed, for instance on a traverse-by-traverse basis. Accordingly, the course of motion for at least one traverse could be generated after relative movement of the analogue probe and object is begun for the first traverse. Optionally, the course of motion for the next traverse could be generated after completion of at least one previous traverse, and optionally after completion of all previous traverses.

Optionally, the method could comprise loading into the machine tool's controller a predetermined course of motion which predefines the relative course of motion of the analogue probe and object for each traverse in the scanning path. In this case, the method can comprise updating the predetermined course of motion based on data obtained during at least one previous traverse.

As will be understood, statements made above in connection with the first aspect of the invention are also, where appropriate, applicable to the second aspect of the invention and vice versa.

According to a third aspect of the invention there is provided a computer program comprising instructions which when executed by a machine tool apparatus causes the machine tool apparatus to perform any of the above described methods.

According to a fourth aspect of the invention there is provided a computer readable medium comprising instructions which when executed by a machine tool apparatus causes the machine tool apparatus to perform any of the above described methods.

Embodiments of the invention will now be described, by way of example only, with reference to the accompanying drawings in which.

Figure 1:
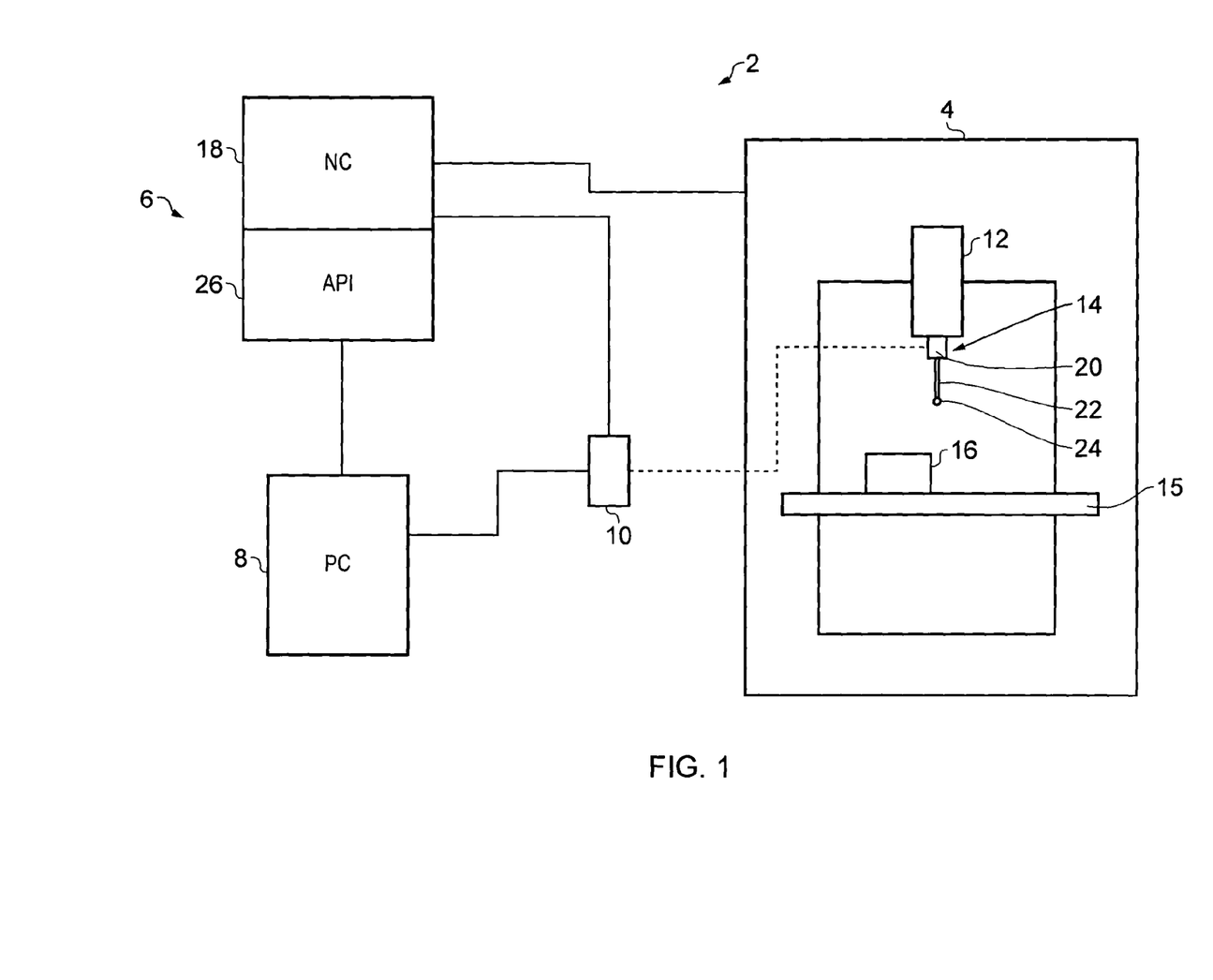
FIG. 1 is a schematic diagram showing the system architecture for a machine tool.

Referring to FIG. 1, there is shown a machine tool apparatus 2 comprising a machine tool 4, a controller 6, a PC 8 and a transmitter/receiver interface 10. The machine tool 4 comprises motors (not shown) for moving a spindle 12 which holds an analogue probe 14 relative to a workpiece 16 located on a table 15. The location of the spindle 12 (and hence the analogue probe 14) is accurately measured in a known manner using encoders or the like. Such measurements provide spindle position data defined in the machine co-ordinate system (x, y, z). A numerical controller (NC) 18 (which is part of the controller 6) controls x, y, z movement of the spindle 12 within the work area of the machine tool and also received data relating to the spindle position.

As will be understood, in alternative embodiments relative movement in any or all of the x, y and z dimensions could be provided by movement of the table 15 relative to the spindle. Furthermore, relative rotational movement of the analogue probe 14 and workpiece 16 could be provided by a part of the spindle 12 (e.g. a rotating/articulated head mounted on the spindle) and/or a part of table 15 (e.g. a rotary table). Furthermore, movement might be restricted to fewer dimensions, e.g. only x, and/or y. Further still, the embodiment described comprises a cartesian machine tool, whereas will be understood this need not necessarily be the case and could be instance be a non-cartesian machine tool. Further still, many other different types of machine tools, including lathes, and parallel-kinematic machines, and robot arms are known and could be used with the invention.

In the embodiment described, the analogue probe 14 is a contact analogue probe which comprises a probe body 20, a workpiece contacting stylus 22 extending from the probe body 20, and has a surface detection region in the form of a workpiece contacting tip 24 (which in this case is in the form of a spherical stylus ball) at the distal end of the stylus 22. The analogue probe 14 measures deflection of the stylus 22 in a probe geometry system (a, b, c). (However, as will be understood, this need not necessarily be the case, and for instance the analogue probe could measure deflection in only 1 or 2 dimensions, or even provide an output indicative of the extent of deflection, without any indication of the direction of deflection). The probe 14 also comprises a transmitter/receiver (not shown) that wirelessly communicates with the transmitter/receiver interface 10 (e.g. via a radio, optical or other wireless transmission mechanism).

Figure 2A:
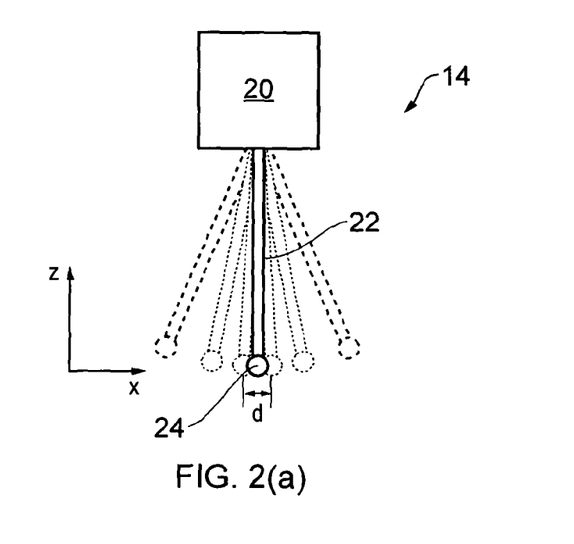
FIGS. 2(a) to (c) are schematic diagrams illustrating the measurement range of analogue measurement probes.

As mentioned above, analogue measurement probes have a limited measurement range. For instance with regard to contact analogue probes, they can have a physical maximum amount by which they can be deflected in the x, y and z dimensions. Not only this, but it can be that the probe is configured such that it works optimally within a certain sub-range of the maximum physical range. For instance, FIG. 2(a) illustrates the analogue probe of FIG. 1, and the solid line represents the position of the stylus 22 at a rest (e.g. undeflected) position. The outermost stylus positions shown in dashed lines represent the maximum physical deflection of the stylus in the x-dimension. However, it could be that the probe is configured such that it is most accurate when the stylus is deflected by an amount less than the maximum physical deflection. It could also be that the probe is configured such that it is most accurate when the stylus is deflected by a minimum lower threshold. For instance, the analogue probe 14 could have a first, e.g. preferred, measurement range, the upper and lower boundaries of which are shown by stylus positions shown in FIG. 2(a) as dotted lines. Accordingly, as can be seen there is a dead space 'd' (in the x-dimension) in the middle close to the stylus' rest position which is outside the preferred measurement range.

As will be understood, the same will also be the case with deflection in the y-dimension. Furthermore, in the described embodiment there is also a maximum physical deflection range in the z-axis as well as a sub-range of z-axis deflections (a preferred measurement range) within which the probe is configured to provide the most accurate results.

Figure 2B:
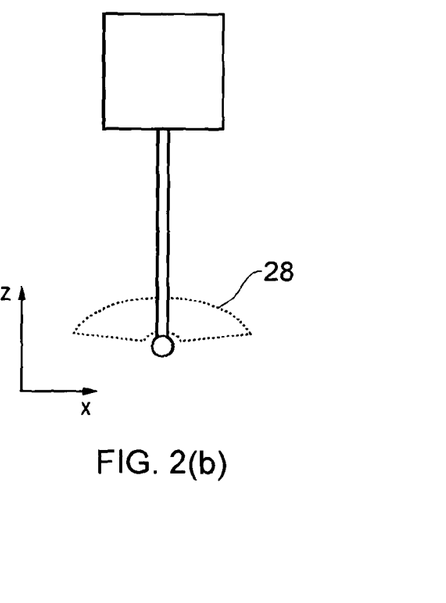

The dotted line 28 shown in FIG. 2(b) schematically illustrates the scope of the analogue probe's 14 preferred measurement range taken in the x and z dimensions. As will be understood, such a range actually extends in a three dimensions, and hence is actually approximately the shape of a squashed hemisphere with a small hole cut out in the middle.

Figure 2C:
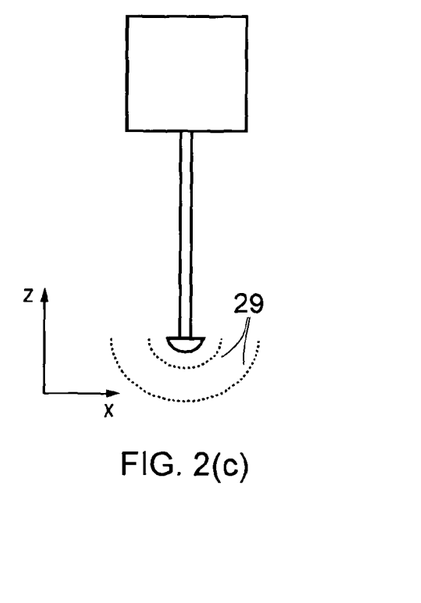

The dotted lines of FIG. 2(c) also schematically illustrate the preferred measurement range for a non-contact probe, such as an inductance probe. The inner and outer dotted lines represent the minimum and maximum probe/workpiece separation boundaries for optimum measuring performance. As will be understood, the preferred measuring range shown for the non-contact probe could be the entire measuring range or only a subset of the entire measuring range for the probe. As will be understood, the entire measuring range could be considered to be what can be referred to as the non-contact probe's surface detecting region.

As will be understood, the size of the preferred measuring range will vary from probe to probe. For a contact analogue probe, it could be for example not more than +/−0.8 mm in any given dimension, for example not more than +/−0.725 mm in any given dimension, for instance not more than +/−0.5 mm in any given dimension, for example in some circumstances not more than +/−0.3 mm in any given dimension (taken from the stylus rest position). Of course, there might also be a dead-zone immediately around the stylus position through which the stylus has to be deflected beyond before it enters the preferred measuring range, which could be for example not less than +/−0.2 mm in any given dimension from the stylus rest position, for instance not less than +/−0.1 mm in any given dimension from the stylus rest position, e.g. not less than +/−0.125 mm in any given dimension (again, measured from the stylus rest position).

The present invention departs from the traditional view that the probe must be maintained such that along the nominal measurement line on the surface of the object the probe always collects data within its preferred measurement range.

Rather, as is clear from the embodiments described below, the invention enables measurements along the nominal measurement line to be obtained both within and outside the probe's preferred measurement range. However, it can be preferred that certain undesirable situations are avoided. For instance, it can be preferred that in the case of a contact analogue probe that over deflection of the probe is avoided, especially over deflection that could risk the stylus or probe breaking. In the case of non-contact analogue probes, it could be preferred that contact between the probe and object is avoided altogether. Accordingly, the techniques disclose below enable scanned measurement data to be obtained quickly whilst avoiding such undesirable situations.

Figure 3:
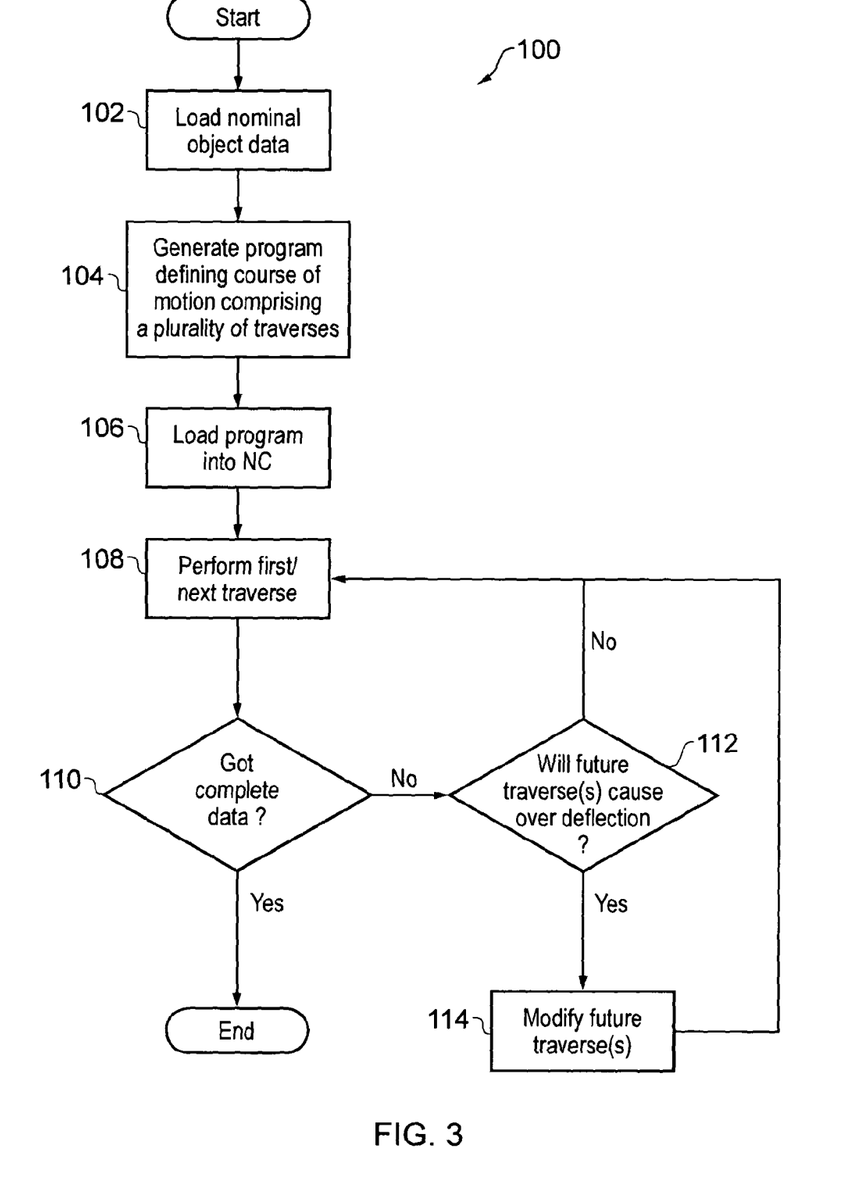
FIG. 3 is a system flow chart illustrating the flow of control during a measurement operation according to an embodiment of the invention.

FIG. 3 illustrates the general procedure 100 involved according to one embodiment of the invention. The method starts at step 102 at which point a model of the part to be measured is loaded into the PC 8. As will be understood, this step might not be performed in embodiments in which the workpiece to be measured is unknown. At step 104 a program defining a course of motion for the analogue probe 14 to obtain scanned measurement data of the workpiece 16 is generated. As will be understood, in embodiments in which the workpiece 16 can be moved as well as, or instead of, the analogue probe 14 (e.g. by virtue of a movable table 15), then the program can also define a course of motion of the workpiece 16. In other words, step 104 comprises planning the relative course of motion between the analogue probe 14 and the workpiece 16 so that the analogue probe 14 can collect scanned measurement data regarding the workpiece 16. In the embodiment described, the course of motion is configured such that analogue probe and workpiece will traverse back and forth across each other a plurality of times, as will be clearer from the description below in connection with FIGS. 4 to 6. At step 106 the program is loaded into the NC 18 via the API 26. At step 108, the NC 18 interprets the program's instructions and generates motor control signals which are used to instruct the machine tool's 4 motors (not shown) so as to move the analogue probe 14 in accordance with one of the traverses defined by the program. At the same time, measurement data is recorded which comprises a number of procedures. In particular, spindle position data (x, y, z) (which as mentioned above is provided by encoders on the machine tool 4) is passed to the PC 8 via the NC 18. Furthermore, probe deflection data (a, b, c) (which as mentioned above is obtained by the analogue probe) is also passed to the PC 8 via the probe transmitter/receiver interface 10. The PC 8 combines the spindle position data (x, y, z) and the probe deflection data (a, b, c) to provide a set of measurements that define the position of a surface within the machine co-ordinate geometry.

The PC 8 then at step 110 determines if from that scan the data from the analogue probe 14 obtained on the traverse just completed was entirely within its preferred measurement range. If so, then the process ends as all relevant measurement data has been obtained. If not, then control proceeds to step 112 at which point the PC 8 determines if, based on knowledge of the future course of motion and also the measurement data collected on the traverse just executed (and/or other previous traverses), whether the analogue probe 14 is likely to exceed its maximum preferred deflection. If so, then at step 114 it manipulates the program in the NC 18 and/or variables referred to by the program loaded in the NC 18 so as to ensure that this does not happen on such a future traverse. As will be understood, it could be the next traverse that is modified, or some other future traverse or even a number of future traverses.

As will be understood, updating an existing course of motion can be quicker than generating a whole new course of motion each time. In particular, steps 112 and 114 can be performed very quickly if the NC 18 receives the probe deflection data and performs steps 112 and 114 itself.

Figure 4:
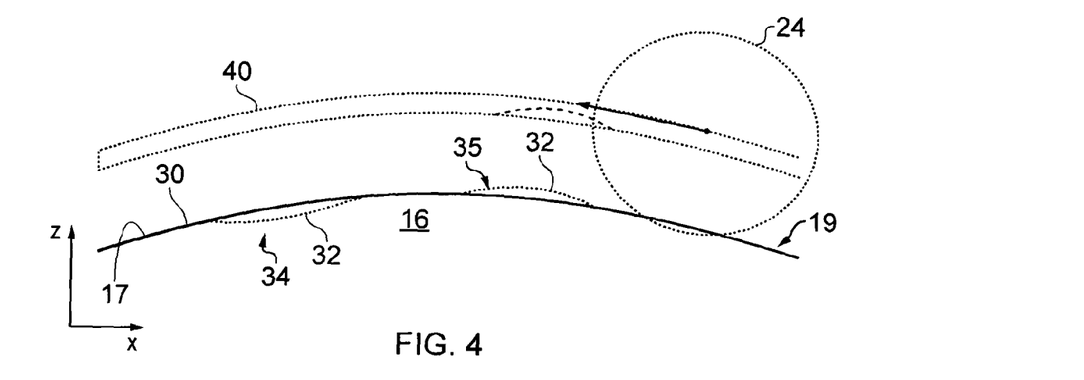
FIG. 4 schematically illustrates different stages in the execution of a measurement operation according to the present invention according to a second embodiment of the invention.

Embodiments of the invention will further be described with reference to FIGS. 4 to 6. In a first embodiment shown in FIG. 4 there is shown a method of measuring a known part. The part is known in that it its nominal shape, dimensions and location are known. In the described embodiment, the nominal shape is illustrated by solid line 30, whereas deviations from its actual shape are illustrated by dotted lines 32. As shown, the actual shape 32 deviates from the nominal or expected shape due to inaccuracies in manufacturing. In particular, as shown the actual shape comprises an unexpected dip 34 and a lump 35 in its shape. The predetermined course of motion comprises two traverses along the same nominal measurement line 19 (seen more easily in FIG. 5(e)) on the surface 17 of the object 16, but wherein the nominal offset distance between the surface of the object and the nominal centre point of the stylus ball 24 is different for the two traverses, so as to ensure that such deviations can also be measured within the analogue probe's preferred measurement range. The nominal position of the stylus ball's 24 centre point along the course of motion is shown by the dotted line 40.

In the embodiment described, the first traverse is the one that is furthest away from the surface 17 of the workpiece 16. Due to the unexpected dip in the surface 17 of the workpiece 16, in accordance with FIG. 3, it will be determined at step 110 that not all of the measurements along the length of the traverse were obtained within the analogue probe's preferred measurement range. Accordingly, the second traverse of the predetermined course of motion is to be performed. However, as mentioned above, as well as the unexpected dip 34 there is also an unexpected lump 35 in the surface 17 of the workpiece 16. This lump 35 would have been detected/measured during the first traverse and so in accordance with steps 112 and 114, it is determined whether in the absence of any modification to the predetermined course of motion the lump would cause the probe to over deflect on the second traverse. In this case it is decided that it would and so a decision is made to modify the predetermined course of motion. The effect of such a modification to the course of motion is that the nominal probe tip centre point deviates from its original nominal course as illustrated by the dashed line 42 in FIG. 4. In the embodiment described, this is achieved by the spindle 12 and hence the probe head 20 shifting from the original predetermined course of motion. As will be understood, this could be achieved in other ways. For instance, if the probe 14 were mounted on an articulated head, then the shift in the course of the nominal tip centre point could also be achieved by causing the probe 14 to rotate about a rotational axis of the articulated head. Optionally, if the table 15 were movable, then this could be achieved by moving the table.

Figure 5A:
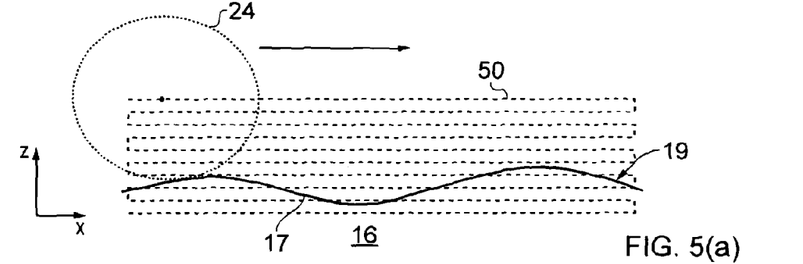
FIGS. 5(a) to (d) schematically illustrate side view of various stages in the execution of a measurement operation according to the present invention according to a first embodiment of the invention, and FIG. 5(e) schematically illustrates a schematic view of FIG. 5(a)
Figure 5B:
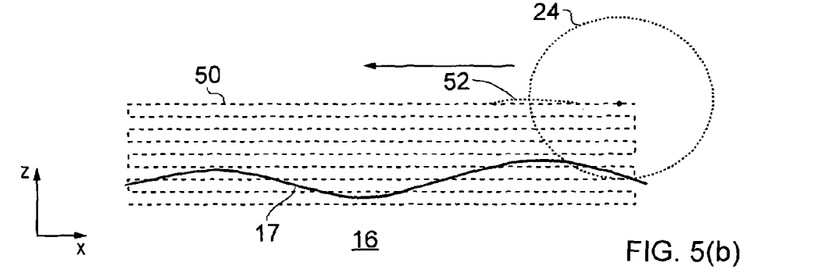
Figure 5C:
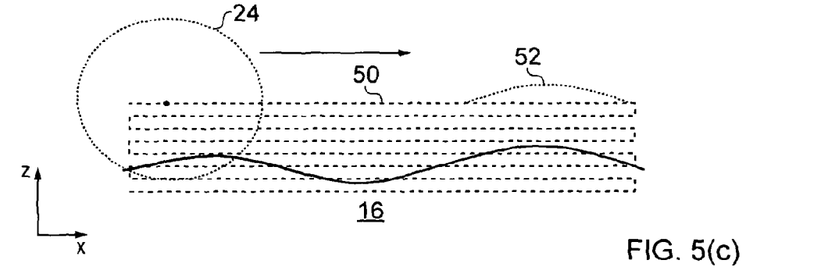

The method of the invention also has value when measuring unknown parts, e.g. parts of unknown shape, dimension and/or position. For instance, with reference to FIGS. 5(a) to (e), an unknown part could be measured by (with reference to FIG. 3) instead of at step 102 loading in nominal object data (indeed there is no nominal object data for an unknown part) and at step 104 generating a path which is based on such nominal object data, simply generating a course of motion which comprises moving the contact analogue probe's 14s stylus tip 24 back and forth across the same nominal measurement line 19 on the object a plurality of times, but each time decreasing the nominal separation between the stylus tip's centre point and the surface of the object. For instance, as shown in FIG. 5(a) a predetermined course of motion is generated which initially is configured to move the stylus tip 24 such that its centre point nominally moves back and forth in straight lines along a common nominal measurement line 19 on the surface of the object a plurality of times, with the nominal offset between it and the surface being reduced for each traverse, as illustrated by the dashed line 50. As shown, because the shape, dimensions and/or position of the object 16 are unknown, the shape of the path of the nominal tip centre is not necessarily the same as the shape of the part and also to ensure that the measurement operation gets all the measurement data it needs, the predetermined course of motion can comprise a much larger number of traverses than is actually required.

Figure 5D:
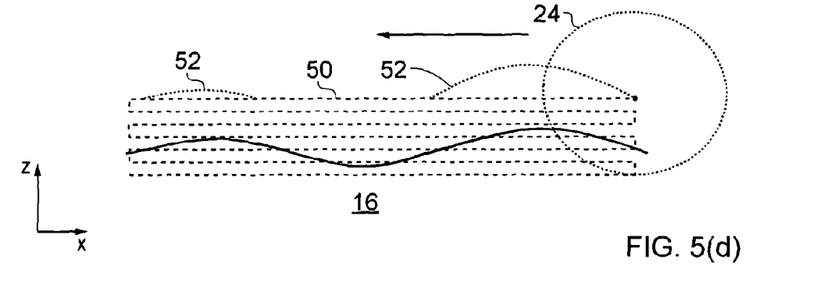
Figure 5E:
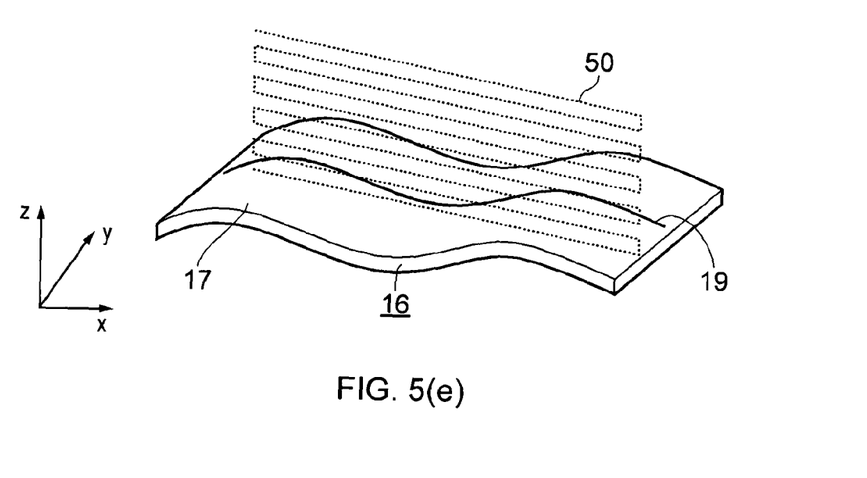

In the case shown, updates to the predetermined course of motion are determined and applied at the end of each traverse (the effect on the nominal position of the probe's centre point along the traverse being illustrated by dotted lines 52) such that for successive traverses over deflection of the stylus 22 is avoided. For the case shown in FIGS. 5(a) to (e) the loop of steps 110 to 114 continues until as shown in FIG. 5(d) when measurement data within the measurement probe's preferred measurement range for the length of a traverse and so the method ends and the subsequent predetermined traverses of the object are not performed.

Figure 7:
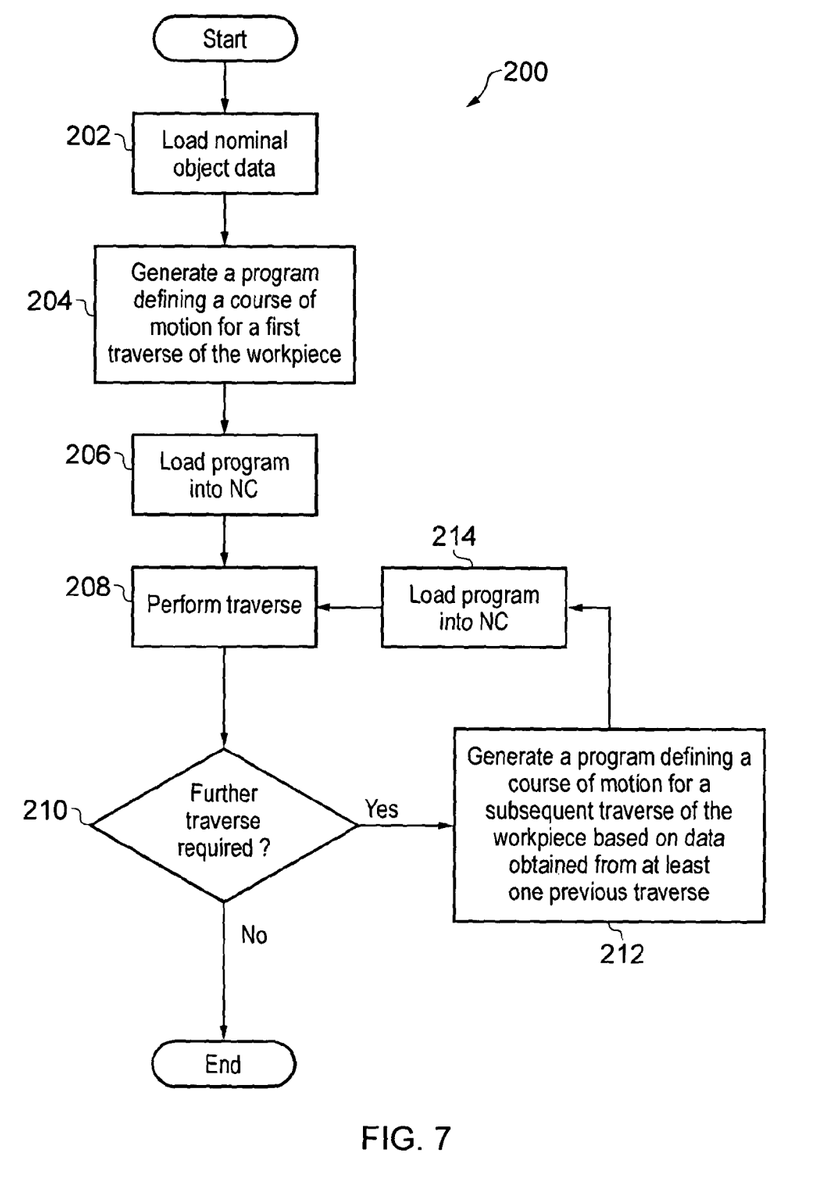
FIG. 7 is a system flow chart illustrating the flow of control during a measurement operation according to another embodiment of the invention.

In the described embodiments it is determined after each traverse if the predetermined course of motion needs updating to take into account surface shape 17 that has been determined from a previous scan, e.g. an unexpected deviation from the nominal shape such as a lump or dip in the surface of the object. As will also be understood, rather than having a predetermined course of motion that is updated after each traverse, the method could comprise instead generating the course of motion traverse-by-traverse. For example, with reference to FIG. 7, the method 200 could comprise the user loading at step 202 into the PC 8 nominal object data and then at step 204 generating a program defining a course of motion for the analogue probe to traverse across the object at least once. This program is then loaded into the NC 18 at step 206 and the at least one traverse is performed at step 208. If at step 210 it is determined that more data is required about the surface of the workpiece, then control proceeds to step 212 at which point a new program is generated defining a course of motion for the analogue probe to perform at least one further traverse across the surface of the workpiece along a different nominal measurement line. The course of motion for the analogue probe defined by this new program can be generated using surface data obtained from at least one previous traverse. This new program is then loaded in the NC 18 at step 214 and is then performed at step 208. This loop continues until sufficient data regarding the surface of the object has been obtained.

Figure 6:
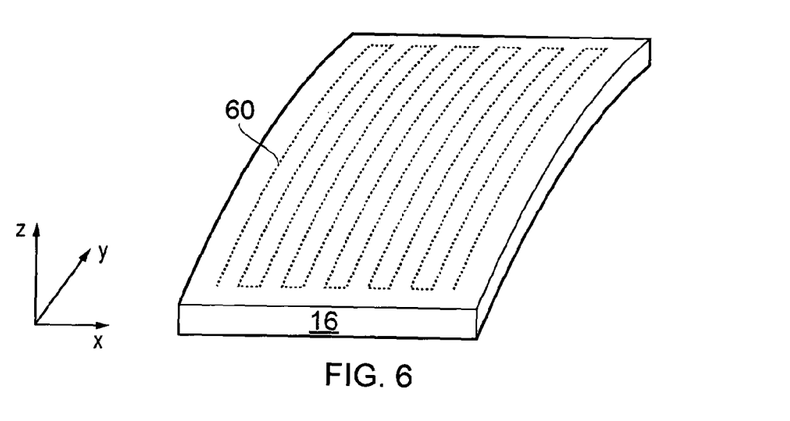
FIG. 6 schematically illustrates an embodiment of the invention in which an object is measured along its length as well as along its width using the method of the invention.

FIG. 6 illustrates an alternative embodiment of the invention in which rather than each traverse of the object taking place along the same nominal measurement line on the surface of the object, the nominal measurement line on the surface of the object is different for different traverses. The nominal path of the probe tip centre point along the surface of the object is illustrated by dotted line 60, from which it can be seen that the path comprises a series of traverses across the surface 17 of the workpiece 16. As can be seen, in the described embodiment, the form of the nominal measurement line for each traverse is substantially identical, and extend parallel to each other. However, as will be understood, this need not necessarily be the case. As with the above described embodiments, the path for a plurality of traverses could be loaded into the NC, and then subsequent traverses could be updated based on previous traverses. Optionally, the method could comprise loading instructions for just a first traverse into the NC, and then instructions for the next traverse(s) could be generated once the first traverse has been completed such that the data from the first traverse can be taken into consideration during the generation of the next traverse.

The instructions for the first traverse can be generated in many different ways. For instance, if the part is a known part, then it could be assumed that the object to be measured will be as is expected and path can be generated accordingly. Optionally, this could be confirmed by taking select measurements of the object along the nominal measurement line before a scan along the traverse is performed. Optionally, especially if the part is unknown, the method could comprise performing an investigative measurement operation to obtain at least some measurement information along the first traverse. For instance, the investigative measurement operation could comprise performing an operation like that described in FIG. 4 or 5. Further optionally, touch-trigger type measurements could be obtained at a number of discrete points along the length of the first traverse prior to performing the first traverse. As another option, a drip feed technique such as that described above in the background section of this application could be used to perform a first traverse.

Accordingly, the first traverse could be treated as an unknown traverse, and subsequent traverses treated as known traverses (in that they are generated based on measurement information obtained from at least one previous traverse). However, the method could be configured such that the output of the probe is monitored during subsequent traverses such that if an unexpected measurement occurs, e.g. if the probe goes outside its preferred measurement range, then it reverts back to performing an unknown traverse (for example using a drip feed technique, or a multiple-pass/rastering scanning technique such as that shown in FIGS. 4 and 5).

In the embodiments shown, the scanning path comprises a plurality of traverses back and forth across the surface of the object. Of course, the traverses could all take place in the same direction. Furthermore, the scanning path doesn't have to comprise a plurality of traverses. For instance, just one traverse could be performed, which is updated at predetermined intervals. Furthermore, the shape of any traverse need not necessarily comprise a generally straight line. For instance, the path of a traverse could meander in a sideways direction, e.g. in a side-to-side motion. Furthermore, the scanning path need not necessarily comprise moving the nominal probe tip centre in a back and forth manner. For instance, each traverse could comprise moving the nominal probe tip centre in a winding (e.g. spiral) manner across the surface of the object. Accordingly, although the above described embodiments illustrate the nominal measurement lines being constrained in a plane covering only a straight line on the surface of the object, this need not necessarily be the case, and each traverse could cover a wide expanse of the surface of the object.

In the above described embodiments, the traverses can be performed at high speed (e.g. with the workpiece sensing part (e.g. the stylus tip 24) and object travelling relative to each other at least at 16 mm/s, preferably at least at 25 mm/s, more preferably at least at 50 mm/s, especially preferably at least at 100 mm/s, for example at least at 250 mm/s) because it doesn't matter whether the probe 14 obtains data below its preferred measuring range and also because the updating of subsequent traverses on the basis of earlier traverses gives the process confidence that the probe 14 and object 16 won't enter into an adverse positional relationship (e.g. such as that the probe's stylus will be caused to over-deflect).

The invention claimed is:

1. A method of building up a measurement data set for a surface of an object, the method comprising:
   using an analogue measurement probe mounted on a machine tool apparatus to obtain scanned measurement data of the surface over a plurality of offset traverses,
   in which a subsequent traverse is offset from a previous traverse such that, over a series of traverses, a surface detecting region of the analogue probe progresses i) laterally across the object, and/or ii) away from or towards the object, and
   in which the course of relative motion for at least one subsequent traverse is generated and/or updated based on data obtained during at least one previous traverse.

2. A method as claimed in claim 1, in which the course of relative motion for said at least one subsequent traverse is generated and/or updated by altering a predetermined course of motion for said subsequent traverse based on data obtained during at least one previous traverse.

3. A method as claimed in claim 1, in which at least one subsequent traverse is updated so as to avoid adverse positional relationships between the object and analogue probe.

4. A method as claimed in claim 3, in which at least one subsequent traverse is updated so as to avoid positional relationships between the object and analogue probe which would cause the analogue probe to obtain data exceeding a first threshold so as to thereby avoid said adverse positional relationships.

5. A method as claimed in claim 1, in which the analogue probe used to obtain the scanned measurement data has a preferred measurement range.

6. A method as claimed in claim 5,
in which the preferred measurement range is defined by at least an upper boundary, and
in which at least one subsequent traverse is updated so as to avoid positional relationships which would cause the analogue probe to obtain measurements that would exceed the upper boundary.

7. A method as claimed in claim 1, in which for each traverse, the analogue probe obtains measurement data along substantially the same nominal measurement line on the surface of the object.

8. A method as claimed in claim 1, in which for each traverse, the analogue probe obtains measurement data along a different nominal measurement line on the surface of the object.

9. A method as claimed in claim 8, in which the form of the nominal measurement line of the traverses is substantially identical.

10. A method as claimed in claim 9, in which the nominal measurement lines extend substantially parallel to each other.

11. A method as claimed in claim 1, in which the analogue probe used to obtain the scanned measurement data is a contact analogue probe.

12. A non-transitory computer readable medium comprising instructions which when executed by a machine tool apparatus cause the machine tool apparatus to perform the method of claim 1.

13. A method of measuring a feature of an object using an analogue probe mounted on a machine tool apparatus, the method comprising:
loading into a controller of the machine tool apparatus a predetermined course of motion along which the analogue probe and object can move relative to each other so as to collect scanned measurement data regarding the feature;
performing a scanning operation by relatively moving the analogue probe and/or object according to the predetermined course of motion,
in which the predetermined course of motion is updated at at least one of a number of predetermined points along the predetermined course of motion based on prior collected scanned measurement data.

14. A machine tool apparatus, comprising:
a machine tool; and
an analogue measurement probe mounted on the machine tool,
in which the machine tool apparatus is configured to move the analogue measurement probe so as to build up a measurement data set for a surface of an object using the analogue measurement probe by obtaining scanned measurement data of the surface over a plurality of offset traverses,
in which a subsequent traverse is offset from a previous traverse such that, over a series of traverses, a surface detecting region of the analogue probe progresses i) laterally across the object, and/or ii) away from or towards the object, and
in which the course of relative motion for at least one subsequent traverse is generated and/or updated based on data obtained during at least one previous traverse.

15. A method of building up a measurement data set for a surface of an object, the method comprising:
using an analogue measurement probe mounted on a machine tool apparatus to obtain scanned measurement data of the surface over a plurality of offset traverses, wherein:
over a series of the plurality of offset traverses comprising previous and subsequent traverses, a said subsequent traverse is offset from a said previous traverse such that a surface detecting region of the analogue probe progresses i) laterally across the object, and/or ii) away from or towards the object, and
the course of relative motion for at least one of the subsequent traverses is generated and/or updated based on data obtained during at least one of the previous traverses.

* * * * *